(12) United States Patent
Moniot et al.

(10) Patent No.: US 10,266,775 B2
(45) Date of Patent: Apr. 23, 2019

(54) PROCESS FOR PRODUCING A HYDROCARBON PRODUCT FLOW FROM A GASEOUS HYDROCARBONACEOUS FEED FLOW AND RELATED INSTALLATION

(71) Applicant: TECHNIP FRANCE, Courbevoie (FR)

(72) Inventors: Rémi Moniot, Chaville (FR); William Lewis Errol Davey, Frankfurt am Main (DE)

(73) Assignee: TECHNIP FRANCE, Courbevoie (FR)

( * ) Notice: Subject to any disclaimer, the term of this patent is extended or adjusted under 35 U.S.C. 154(b) by 0 days.

(21) Appl. No.: 14/893,704

(22) PCT Filed: Oct. 26, 2015

(86) PCT No.: PCT/IB2015/002437
§ 371 (c)(1),
(2) Date: Nov. 24, 2015

(87) PCT Pub. No.: WO2017/072548
PCT Pub. Date: May 4, 2017

(65) Prior Publication Data
US 2018/0251682 A1    Sep. 6, 2018

(51) Int. Cl.
*C10G 2/00* (2006.01)
*C01B 3/24* (2006.01)
(Continued)

(52) U.S. Cl.
CPC .................. *C10G 2/32* (2013.01); *C01B 3/24* (2013.01); *C10G 7/00* (2013.01); *C10G 57/00* (2013.01);
(Continued)

(58) Field of Classification Search
None
See application file for complete search history.

(56) References Cited

U.S. PATENT DOCUMENTS

| | | |
|---|---|---|
| 2,243,869 A | 6/1941 | Keith, Jr. et al. |
| 4,046,829 A | 9/1977 | Ireland et al. |

(Continued)

FOREIGN PATENT DOCUMENTS

| | | |
|---|---|---|
| BE | 830911 | 11/1975 |
| JP | 63-243194 | 10/1988 |

(Continued)

OTHER PUBLICATIONS

PCT International Search Report and PCT Written Opinion of the International Searching Authority dated Jun. 27, 2016 corresponding to International Application No. PCT/IB2015/002437 filed Oct. 26, 2015.
André Steynberg and Mark Dry, "Fischer-Tropsch Technology," Elsevier (published Oct. 2004).

*Primary Examiner* — Medhanit W Bahta
(74) *Attorney, Agent, or Firm* — Locke Lord LLP; Alan B. Clement; Peter J. Fallon

(57) ABSTRACT

The process comprises:
 introducing a feed flow in a synthesis gas generation unit to form a synthesis gas flow and introducing the synthesis gas flow in a Fischer-Tropsch synthesis unit
 at least partially removing carbon dioxide from a first flow formed from a Fischer-Tropsch tail gas flow to form a carbon dioxide depleted flow;
 forming a tail gas recycle flow from the carbon dioxide depleted flow;
 introducing the tail gas recycle flow in the synthesis gas generation unit and/or in the synthesis gas flow.
The process comprises adjusting the carbon dioxide content in the tail gas recycle flow to control the hydrogen to carbon monoxide molar ratio in the synthesis gas flow to a target hydrogen to carbon monoxide molar ratio.

15 Claims, 2 Drawing Sheets

(51) Int. Cl.
  *C10K 1/00*   (2006.01)
  *C10K 1/08*   (2006.01)
  *C10K 1/32*   (2006.01)
  *C10G 7/00*   (2006.01)
  *C10G 57/00*  (2006.01)

(52) U.S. Cl.
  CPC .............. *C10K 1/005* (2013.01); *C10K 1/08* (2013.01); *C10K 1/32* (2013.01); *C01B 2203/0277* (2013.01); *C01B 2203/0475* (2013.01); *C01B 2203/1235* (2013.01); *C01B 2203/148* (2013.01); *C10G 2300/1022* (2013.01); *C10G 2400/02* (2013.01); *C10G 2400/04* (2013.01); *C10G 2400/08* (2013.01)

(56) References Cited

U.S. PATENT DOCUMENTS

| | | |
|---|---|---|
| 5,543,437 A | 8/1996 | Benham et al. |
| 5,689,031 A | 11/1997 | Berlowitz et al. |
| 8,445,549 B2 | 5/2013 | Allam |
| 2002/0120017 A1 | 8/2002 | Bohn et al. |
| 2003/0055117 A1 | 3/2003 | O'Rear et al. |
| 2003/0236312 A1 | 12/2003 | O'Rear |
| 2005/0245619 A1 | 11/2005 | Fenouil et al. |
| 2015/0018437 A1 | 1/2015 | Nel et al. |

FOREIGN PATENT DOCUMENTS

| | | |
|---|---|---|
| WO | WO 2007/069197 A2 | 6/2007 |
| WO | WO 2017/072548 A | 5/2017 |

PROCESS FOR PRODUCING A HYDROCARBON PRODUCT FLOW FROM A GASEOUS HYDROCARBONACEOUS FEED FLOW AND RELATED INSTALLATION

This application is a National Stage application of International Patent Application Number, PCT/IB2015/002437, filed on Oct. 26, 2015, the entire contents of which are incorporated herein by reference.

The present invention concerns a process for producing a hydrocarbon product flow from a gaseous hydrocarbonaceous feed flow, the process comprising the following steps:

introducing the feed flow in a synthesis gas generation unit to form a synthesis gas flow by reforming and/or partial oxidation of the feed flow;

introducing the synthesis gas flow in a Fischer-Tropsch synthesis unit, to form the hydrocarbon product flow;

forming a Fischer Tropsch offgas flow from the Fischer-Tropsch synthesis unit;

separating the Fischer Tropsch offgas flow into a Fischer Tropsch offgas recycle flow and a Fischer Tropsch tail gas flow;

recycling the Fischer Tropsch offgas recycle flow in the synthesis gas flow fed to the Fischer Tropsch synthesis unit;

at least partially removing carbon dioxide from a first flow formed from the Fischer-Tropsch tail gas flow in a carbon dioxide removal unit to form a carbon dioxide depleted flow;

forming a tail gas recycle flow from the carbon dioxide depleted flow;

introducing the tail gas recycle flow in the synthesis gas generation unit and/or in the synthesis gas flow.

Such a process is in particular designed for producing a liquid hydrocarbon product flow, mainly middle distillates, which can be separated into valuable hydrocarbon cuts such as diesel and/or naphtha and/or kerosene.

The feed flow is for example a natural gas stream. It is introduced in a synthesis gas generation unit to be converted into a synthesis gas flow comprising mainly hydrogen and carbon monoxide. The synthesis gas is then sent to a Fischer-Tropsch synthesis unit to generate the hydrocarbon product flow (middle distillates) which could be upgraded into valuable hydrocarbon cuts such as diesel and/or naphtha and/or kerosene by catalytic hydro-treatment and/or hydro-isomerization and separation.

The synthesis gas generation unit generally uses a reforming process which is fed with a mixture of a hydrocarbonaceous feed flow, such as natural gas, an oxidizing flow, such as air and/or oxygen, and/or a water flow, in liquid or vapor phase.

The synthesis gas generation unit for example comprises an autothermal reforming unit (ATR), a catalytic partial oxidation unit, a non-catalytic partial oxidation unit, a gas heated reformer, a steam methane reformer (SMR) and/or a combination of them.

The Fischer-Tropsch synthesis unit converts the synthesis gas to hydrocarbon chains of various lengths.

The chain lengths are controlled by the ratio of hydrogen to carbon monoxide which is fed to the Fischer-Tropsch reactor. This ratio must be controlled very precisely at the stoichiometry of the reactions to aim an appropriate Fischer-Tropsch synthesis in the synthesis unit, depending on an expected end product selectivity.

However, the synthesis gas produced in the synthesis gas generation unit does not always have the exact or appropriate hydrogen to carbon monoxide ratio. For example, a typical natural gas which is reformed by an autothermal reformer (ATR) process produces a synthesis gas with a hydrogen to carbon monoxide ratio ranging from 1.5 to 2.5 depending on the reforming conditions and/or feedstock quality. A steam methane reformer (SMR) may produce a synthesis gas with a hydrogen to carbon monoxide ratio ranging from 2.1 to 5 depending on the reforming conditions and/or feedstock quality.

It is a conventional practice to modify the steam concentration fed to the synthesis gas generation unit in order to adjust the ratio of hydrogen to carbon monoxide in the synthesis gas fed to the Fischer Tropsch Unit.

Nevertheless, adjusting the steam to carbon ratio in the synthesis gas generation unit, has an impact on carbon dioxide concentration in the synthesis gas. The carbon dioxide acts as an inert in the Fischer-Tropsch synthesis unit and depresses the conversion rate that can be achieved. Consequently, the equipment making up the process has to be larger and more expensive for a given production rate of hydrocarbon product when the carbon dioxide concentration increases.

Furthermore, reducing the steam to carbon ratio creates operating conditions increasing the risk for carbon deposit which might partially damage the unit (in particular metal dusting). However, technologies have been developed over the years to overcome this problem and are able to deal with such low ratios.

Moreover, in known production processes, a tail gas is formed from the Fischer-Tropsch synthesis unit residual synthesis gas. Such a tail gas, before being recycled to synthesis gas unit, is first partially purged out of the system, practically to a fuel gas pool, to reduce the amount of inert compounds such as nitrogen or carbon dioxide. The recycle tail gas, non-purged fraction of the Fischer Tropsch tail gas, is reintroduced in the synthesis gas generation unit, such as disclosed in US 2005/0245619. It is widely known that Fischer Tropsch tail gas, as a recycle to the synthesis gas generation unit, can modify the hydrogen to carbon monoxide ratio in synthesis gas.

In the process disclosed in US 2005/0245619, the carbon dioxide is totally removed from the recycle tail gas, which finally contains almost only hydrogen and residual hydrocarbons. The recycle tail gas increases the hydrogen to carbon monoxide ratio in the synthesis gas.

This practice is used for a synthesis gas poor in hydrogen to increase the hydrogen to carbon monoxide ratio. The solution described in US 2005/0245619 is not applicable when the ratio of hydrogen to carbon monoxide in the synthesis gas is higher than required. The recycling, as practice in US 2005/0245619, would then increases even more the hydrogen to carbon monoxide ratio which was expected to be lowered.

The other practice is to add steam in the feed stream to increase the hydrogen to carbon monoxide ratio, but this practice results in an increase of carbon dioxide content in the synthesis gas.

When the synthesis gas hydrogen to carbon monoxide ratio is higher than expected, an alternate method would consist in recycling the tail gas, without removing the carbon dioxide it contains.

Then, in order to limit the effect on the ratio of hydrogen to carbon monoxide in the synthesis gas generation unit, the amount of tail gas which is recycled to the synthesis gas generation unit is then limited.

This leads to recycling a small quantity of tail gas and generating a significant unused portion of the tail gas which must be used as fuel gas. Once the fuel gas demand of the installation has been met, the unused portion of the tail gas is flared or used as fuel to generate additional electricity. The flaring of unused tail gas is regarded as an undesirable practice, in particular for environmental constraints. Generating electrical energy with unused tail gas is acceptable, but with an efficiency that is significantly lower than in a modern power station.

In the common practice of recycling a fraction of Fischer Tropsch tail gas, the following two main contradictory objectives are expected:

Maximizing the recycling of Fischer Tropsch tail gas non-purge fraction to the synthesis gas generation unit to maximize the overall carbon conversion to liquid hydrocarbon products, without controlling the effect on the hydrogen to carbon monoxide ratio in synthesis gas affecting Fischer Tropsch reaction stoichiometry Recycling the required amount of Fischer Tropsch tail gas non-purge fraction to the synthesis gas generation unit, to adjust the hydrogen to carbon monoxide ratio in the synthesis gas to the exact Fischer Tropsch reaction stoichiometry, and valorizing the used fraction of tail gas non-purge fraction not recycled to synthesis gas generation unit as power generation or any other by products.

The common practice does not allow maximizing the carbon conversion into liquid hydrocarbon products and adjusting the hydrogen to carbon monoxide ratio in synthesis gas fed to Fischer Tropsch unit at the same time.

One aim of the invention is to provide a method which maximizes the carbon conversion into liquid hydrocarbon product in a Fischer Tropsch unit, with various operating conditions and/or fuel gas overall consumption and/or feed gas composition, without changing significantly the equipment for carrying out the process.

To this aim, the subject-matter of the invention is a process of the above-mentioned type, wherein the process comprises adjusting the carbon dioxide content in the tail gas recycle flow to control the hydrogen to carbon monoxide molar ratio in the synthesis gas flow to a target hydrogen to carbon monoxide molar ratio.

The process according to the invention may comprise one or more of the following features, taken alone or according to any possible technical combination:

it comprises the following steps:
  forming a bypass flow from the tail gas flow to bypass the carbon dioxide removal unit;
  mixing the carbon dioxide depleted flow with the bypass flow to form the tail gas recycle flow;
the adjustment of the carbon dioxide content including controlling the relative flowrates of the bypass flow and of the carbon dioxide depleted flow as a function of the target hydrogen to carbon monoxide ratio in the synthesis gas;
the carbon dioxide volume content in the tail gas recycle flow is smaller than 30% molar and more specifically smaller than 20% molar;
the reforming and/or partial oxidation of the feed flow is carried out by one or a combination of an autothermal reformer, catalytic partial oxidation reformer, non-catalytic partial oxidation reformer, gas heated reformer and steam methane reformer;
the hydrogen to carbon monoxide volume ratio in the synthesis gas flow is comprised between 1.7 to 2.2, preferably between 1.9 and 2.1;
a fuel gas flow is extracted from the tail gas flow, upstream of the carbon dioxide removal unit;
a fuel gas flow is extracted from the carbon dioxide depleted flow;
the process comprises adjusting the flow rate of the fuel gas flow to partially or fully meet the fuel gas demand of the process;
the process comprises providing a vapor and/or liquid water flow to the synthesis gas generation unit and maintaining the molar ratio of water to carbon in the feed flow and tail gas recycle flow fed to the synthesis gas generator unit constant, preferentially at a value comprised between 0 and 3, in particular between 0.3 and 0.9 when the reforming and/or partial oxidation of the feed flow is carried out in an autothermal reformer, a catalytic partial oxidation reformer and/or a non-catalytic reformer and preferentially at a value between 1.4 and 2.5 when the reforming and/or partial oxidation of the feed flow is carried out in steam methane reformer;
the process comprises treating the liquid hydrocarbon product flow to form diesel and/or kerosene and/or naphtha;
the synthesis gas flow contains less than 10% by volume of carbon dioxide, advantageously less than 6% by volume of carbon dioxide.

The invention also concerns an installation for producing a hydrocarbon product flow from a gaseous hydrocarbonaceous feed flow, the installation comprising:

a synthesis gas generation unit and an equipment for introducing the feed flow in the synthesis gas generation unit to form a synthesis gas flow by reforming of the feed flow;
a Fischer-Tropsch synthesis unit and an equipment for introducing the synthesis gas flow in the Fischer-Tropsch synthesis unit, to form the hydrocarbon product flow;
an equipment for forming a Fischer Tropsch offgas flow from the Fischer-Tropsch synthesis unit;
an equipment for separating the Fischer Tropsch offgas flow into a Fischer Tropsch offgas recycle flow and a Fischer Tropsch tail gas flow;
an equipment for recycling the Fischer Tropsch offgas recycle flow in the synthesis gas flow fed to the Fischer Tropsch synthesis unit;
a carbon dioxide removal unit to produce a carbon dioxide depleted flow from a first flow formed from the Fischer-Tropsch tail gas flow;
an equipment for forming a tail gas recycle flow from the carbon dioxide depleted flow;
an equipment for introducing the tail gas recycle flow in the synthesis gas generation unit and/or in the synthesis gas flow;
wherein the installation comprises an equipment for adjusting the carbon dioxide content in the tail gas recycle flow to control the hydrogen to carbon monoxide molar ratio in the synthesis gas flow to a target hydrogen to carbon monoxide molar ratio.

The installation according to invention may comprise one or more of the following features, taken alone or according to any possible technical combination:

it comprises:
  an equipment for forming a bypass flow from the tail gas flow to bypass the carbon dioxide removal unit;
  an equipment for mixing the carbon dioxide depleted flow with the bypass flow to form the tail gas recycle flow;
the equipment for adjustment of the carbon dioxide content including a controlling unit for controlling the relative flowrates of the bypass flow and of the carbon dioxide depleted flow as a function of the target hydrogen to carbon monoxide ratio in the synthesis gas;

the installation comprises a withdrawing equipment for withdrawing a fuel gas flow, the withdrawing equipment being located upstream of a carbon dioxide removal unit;

the installation comprises a withdrawing equipment for withdrawing a fuel gas flow, the withdrawing equipment being located downstream of the carbon dioxide removal unit;

the carbon dioxide depleted flow contains less than 20% molar of carbon dioxide, preferably less than 10% molar of carbon dioxide, more preferably less than 5% molar of carbon dioxide, and in particular less than 2% molar of carbon dioxide.

The invention will be better understood, upon reading of the following description, given solely as an example, and made in reference to appended drawings, in which.

Figure 1:
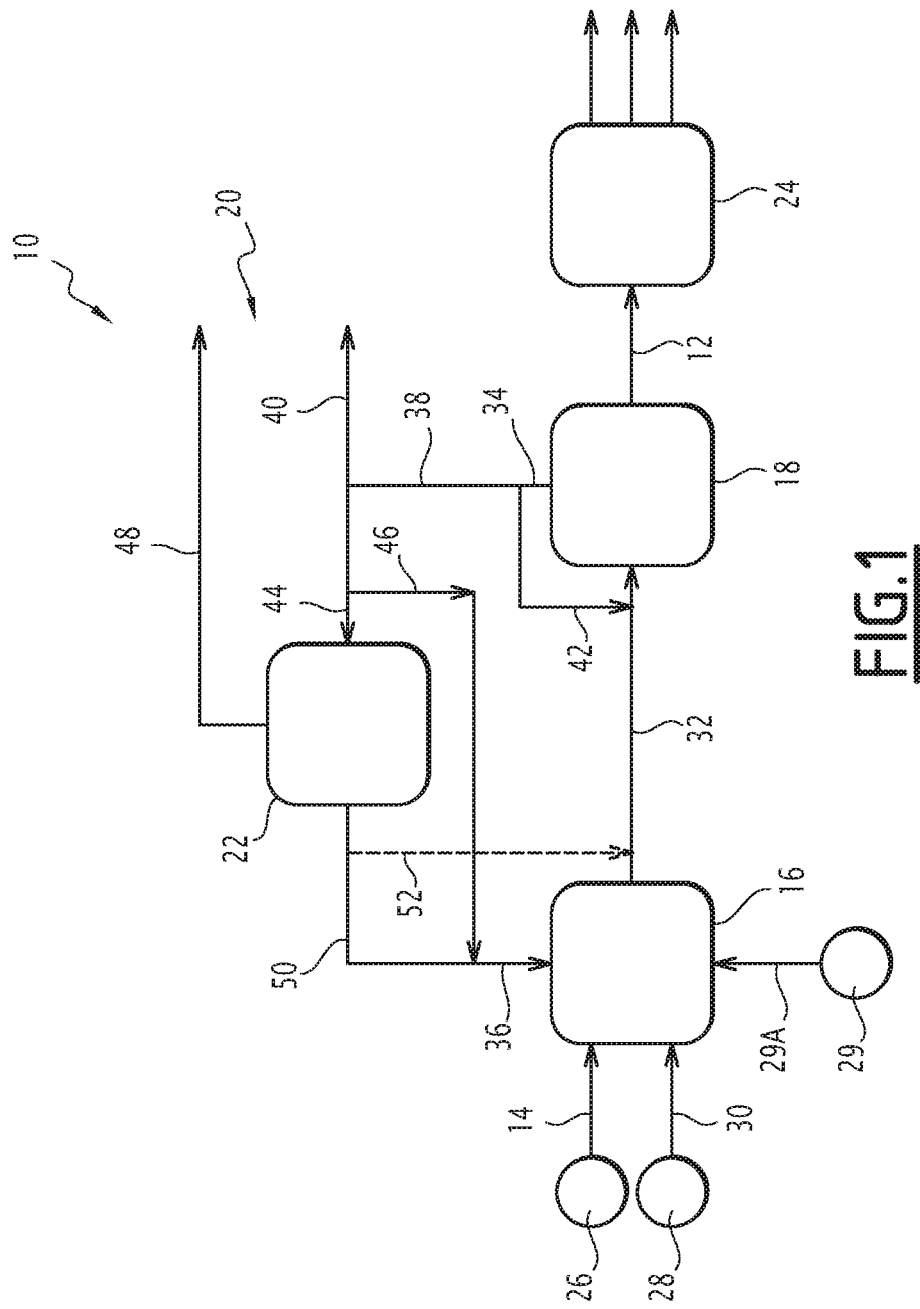
FIG. 1 is a schematic view of a first installation according to the invention.

A first installation 10 for producing a liquid hydrocarbon product flow 12 from a gaseous hydrocarbonaceous feed flow 14 is shown schematically in FIG. 1. The installation 10 comprises a synthesis gas generation unit 16, and a Fischer-Tropsch synthesis unit 18, downstream of the synthesis gas generation unit 16.

Additionally, the installation 10 comprises a recycle loop 20 comprising a carbon dioxide removal unit 22. The installation 10 optionally comprises a treatment unit 24 for upgrading the liquid hydrocarbon product flow 12.

The feed flow 14 is formed from a feedstock 26. The feedstock 26 is for example a gaseous hydrocarbon such as natural gas, refinery off-gas, and/or a liquefied petroleum gas. In some instances, the feedstock 26 is a residue coke, coal or biomass.

The feed flow 14 is for example methane, natural gas, associated gas, or a mixture of C1 to C10 hydrocarbons. In most cases, the feed flow 14 comprises methane. In particular the feed flow 14 comprises more than 50% molar and up to 100% molar methane. It comprises for example between 0% and 15% molar C2 to C4 hydrocarbons.

Advantageously, on an atomic basis, hydrogen to carbon ratio (H/C) shall not exceed 4 in feed flow 14 and shall preferably be comprised between 2 to 4.

The synthesis gas generation unit 16 comprises at least a reformer able to reform the feed flow 14 to produce synthesis gas.

The reforming can be catalytic, as well as non-catalytic. The reformer comprises an autothermal reformer (ATR), a catalytic partial oxidation reformer, a non-catalytic partial oxidation reformer, a gas heated reformer, a steam methane reformer (SMR) or a combination thereof.

When needed, the synthesis gas generation unit 16 is also fed with an oxidizing flow 30 such as oxygen and/or air obtained from a source 28 of oxidizing compound, and with a Fischer Tropsch tail gas recycle flow 36, as will be described below.

Preferentially, the synthesis gas generation unit 16 is controlled to yield a fixed outlet temperature from the reformer (for example in a range from 900° C. to 1300° C.). This advantageously results in an operation with a ratio of oxygen molar content in the oxidizing flow 30 to carbon molar content in feed flow 14 and tail gas recycle flow 36 preferentially comprised between 0.4 and 0.6.

The synthesis gas generation unit 16 is also fed with a water flow 29A, obtained from a source 29, of water under vapor and/or liquid state, to carry out the conversion of the feed flow 14 into synthesis gas.

The flow rate of the water flow 29A is fixed by the molar ratio of steam to carbon in the feed flow 14 and tail gas recycle flow 36 fed to the unit 16. The molar ratio of steam to carbon is preferentially comprised between 0 and 3, advantageously between 0.3 and 0.9, in particular between 0.4 and 0.8 when an autothermal reformer, a catalytic partial oxidation reformer and/or non-catalytic reformer processes are used and between 1.4 and 2.5 when a steam methane reformer is used.

According to the invention, this ratio is held constant at the lowest suitable value.

The synthesis gas generation unit 16 is able to produce, from the feed flow 14, from the tail gas recycle flow 36, from the water flow 29A and from the oxidizing flow 30, a synthesis gas flow 32 comprising a majority of hydrogen and carbon monoxide with controlled hydrogen to carbon monoxide molar ratio. The target molar ratio of hydrogen to carbon monoxide is preferentially comprised between 1.7 and 2.2, more specifically between 1.9 and 2.1.

According to the invention, the synthesis gas flow 32 contains less than 10% by volume of carbon dioxide, more specifically less than 6% by volume of carbon dioxide.

The Fischer-Tropsch synthesis unit 18 is able to convert the synthesis gas 32 to a hydrocarbon product flow 12 using a catalytic conversion with a Fischer-Tropsch catalyst.

Example of catalysts which can be used in the Fischer-Tropsch synthesis units are cobalt based catalyst, but also iron, platinum, rhenium, ruthenium-based catalysts or mixtures of any of these elements.

More details about Fischer-Tropsch catalysts are given for example in "Fischer-Tropsch Technology" by A. Steynberg and M. Dry, Elsevier Publishing (2004).

The Fischer-Tropsch synthesis unit 18 is able to carry out a series of chemical reactions between hydrogen and carbon monoxide to produce a variety of hydrocarbons, in particular alkanes having the formula $C_nH_{2n+2}$, with n typically being comprised between 1 and 100, in particular between 4 and 60.

The hydrocarbon product flow 12 is liquid and/or solid at the outlet of the Fischer-Tropsch synthesis unit 18.

The recycling loop 20 is able to recycle at least part of a Fischer-Tropsch tail gas flow 34 obtained as a by-product of the synthesis unit 18 to the synthesis gas generation unit 16.

According to the invention, at least part of the carbon dioxide contained in the off gas flow 34 is removed in the carbon dioxide removal unit 22 to produce the Fischer-Tropsch tail gas recycle flow 36 with a controlled carbon dioxide content, the recycle flow 36 being introduced in the synthesis gas generation unit 16.

The carbon dioxide content in the tail gas recycle flow 36 is adjusted with an adjusting equipment (not shown) comprising a control unit to control the ratio of hydrogen to carbon monoxide in the synthesis gas flow 32 downstream of the synthesis gas generation unit 16 to a target ratio of hydrogen to carbon monoxide.

The carbon dioxide removal unit 22 is for example based on a solvent absorption treatment, and/or an adsorption process (e.g. on molecular sieves) and/or a membrane diffusion process. It is able to remove a variable quantity of carbon dioxide in a treatment flow 44. The amount which can be removed is for example at least 60% molar, preferentially at least 90% molar, and in particular between 95% and 99.99% molar of carbon dioxide of the carbon dioxide contained in the treatment flow 44.

The treatment unit 24 is for example an upgrading unit comprising at least a distillation column able to produce valuable distillates such as diesel, and/or naphtha and/or kerosene, from the mixture of light and heavy oil and wax produced in unit 18. The diesel and/or kerosene can be used as a fuel for diesel engines or jet engines respectively. The naphtha can be used as a fuel for a gas turbine, as feedstock for a steam cracker, as chemical feedstock, as a gasoline blend stock or can be upgraded to gasoline or can be upgraded to polyethylene.

A first process according to the invention, carried out in the first installation 10, will be now described.

In the process, the gaseous hydrocarbonaceous feed flow 14, the water flow 29A and the oxidizing flow 30 when needed are simultaneously fed to the synthesis gas generation unit 16.

The synthesis gas generation unit 16 is also fed with the Fischer-Tropsch tail gas recycle flow 36, as will be explained later.

As mentioned above, the ratio of the molar oxygen content in the oxidizing flow 30 to the carbon molar content as globally fed to the unit 16 is maintained at a level which permits the desired reforming temperature to be accomplished. The ratio is advantageously constant during the operation of the process.

The molar ratio of oxygen to carbon in feed flow 14 and tail gas recycle flow 36 fed to the unit 16 is preferentially more than 0.3 and is preferentially comprised between 0.4 and 0.6.

The synthesis gas generation unit 16 is also fed with a water flow 29A, obtained from a source 29 of water under vapor and/or liquid state to perform the conversion of the feed into synthesis gas.

The molar ratio of steam to carbon in feed flow 14 and tail gas recycle flow 36 fed to the unit 16 is preferentially comprised between 0 and 3, advantageously between 0.3 and 0.9 when an autothermal reformer, a catalytic partial oxidation reformer and/or a non-catalytic reformer processes are used and between 1.4 and 2.5 when a steam methane reformer is used.

The molar ratio is preferably kept constant at the lowest suitable value.

The synthesis gas generation unit 16 produces a synthesis gas flow 32 which is controlled to keep a hydrogen to carbon monoxide molar ratio to a target value comprised between 1.7 and 2.2, more specifically between 1.9 and 2.1.

The synthesis gas flow 32 is then introduced into the Fischer-Tropsch synthesis unit 18 to produce the hydrocarbon product flow 12, as defined above.

A Fischer-Tropsch off-gas flow 34 is here recovered from the unit 18. The Fischer-Tropsch off-gas flow 34 is split into the Fischer-Tropsch tail gas flow 38 and into a Fischer-Tropsch off-gas recycle flow 42. The Fischer-Tropsch off gas recycle flow 42 is then introduced in the synthesis gas flow 32, upstream of the Fischer-Tropsch synthesis unit 18.

The flow rate of the Fischer-Tropsch off-gas flow 34 is for example comprised between 50% molar and 95% molar of the recombined synthesis gas flow, which results from mixing of the synthesis gas flow 32 and of the off-gas recycle flow 42.

The Fischer-Tropsch tail gas 38 is generally composed of 20% to 30% molar carbon dioxide. It advantageously comprises 20% to 40% molar hydrogen, 10% to 30% carbon monoxide and 10% to 30% methane, 0% to 3% olefins and up to 2% oxygenates, advantageously up to 1% oxygenates.

In FIG. 1, the fuel gas flow 40 is withdrawn in the Fischer-Tropsch tail gas 38 upstream of the carbon dioxide removal unit 22.

In the process according to the invention, the fuel gas 40 flow rate correspond to the demand of the installation 10 and to the potential demand of ancillary installations. As a consequence, the molar ratio of the flow rate of the fuel gas flow 40 to the tail gas flow 38 is generally comprised between 15% and 40% in particular between 20% and 40%. The remaining tail gas flow 38 is fully recycled to the synthesis gas generation unit 16.

In the example of FIG. 1, the fuel gas flow 40 contains a high proportion of carbon dioxide (for example more than 20% molar of carbon dioxide) and consequently has a low heating value. This fuel gas flow 40 is able to produce a lower emission of nitrogen oxides when combusted in a conventional burner than is achievable using natural gas. This is particularly advantageous as the emission of nitrogen oxides is subject to strict regulations in some countries.

In the example of FIG. 1, the tail gas flow 38 is then split into a first treatment flow 44, intended to be introduced in the carbon dioxide removal unit 22 and into a by-pass flow 46 intended to by-pass the carbon dioxide removal unit 22.

The treatment flow 44 is introduced in the carbon dioxide removal unit 22 to generate a carbon dioxide flow 48 and a flow 50 depleted in carbon dioxide intended to be mixed with the by-pass flow 46 to form the Fischer-Tropsch tail gas recycle flow 36.

The carbon dioxide flow 48 contains for example more than 97 molar % on dry basis of carbon dioxide.

The carbon dioxide depleted flow 50 contains less than 20% molar of carbon dioxide, more suitably less than 10%, more preferably less than 5%, and in particular less than 2%.

The by-pass flow 46 contains between 20% and 30% molar of carbon dioxide. The carbon dioxide content of the by-pass flow 46 is here equal to the carbon dioxide content of the off-gas flow 34 and of the tail gas flow 38.

According to the invention, the respective flow rates of the by-pass flow 46 and of the carbon dioxide depleted flow 50 are controlled to adjust the hydrogen to carbon monoxide molar ratio in the synthesis gas flow 32 to the target ratio defined above.

The tail gas ratio 36 is then injected in the synthesis gas generation unit 16 and provides feed material thanks to the hydrocarbons it contains, maximizing overall carbon conversion efficiency. It also provides CO shift reaction material, thanks to the carbon dioxide it contains, to adjust hydrogen to carbon monoxide ratio of synthesis gas flow 32 on demand. CO Shift reaction is an equilibrium reaction occurring in the range of operating conditions encountered in synthesis gas generation processes previously described, specifically in the presence of reforming catalyst, but also without catalyst present. CO Shift, also called water gas shift, refers to the reversible reaction of carbon monoxide, water, hydrogen and carbon dioxide species where:

$$CO_2 + H_2 \leftrightarrow CO + H_2O$$

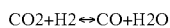

Preferentially, the hydrogen to carbon monoxide ratio in the synthesis gas flow 32 is regularly and/or permanently monitored by known analytical means such as gas chromatography (laboratory and/or online testing). The respective flow rates of flows 46, 50 are regularly and/or permanently adjusted to control the hydrogen to carbon monoxide ratio in the synthesis gas flow 32.

If the hydrogen to carbon monoxide ratio in the synthesis gas flow 32 decreases, the relative proportion of by-pass gas 46 containing carbon dioxide is decreased in the tail gas recycle flow 36 to decrease the quantity of hydrogen shift into carbon monoxide via CO-shift reaction in synthesis gas generation unit 16 and to increase the hydrogen to carbon monoxide ratio in the synthesis gas flow 32.

On the contrary, if the hydrogen to carbon monoxide ratio in the synthesis gas flow 32 increases, the relative proportion of by-pass flow 46 injected in the tail gas recycle flow 36 is increased to increase the carbon dioxide content in the recycle flow 36 and decrease the hydrogen to carbon monoxide ratio in the synthesis gas flow 32 by consuming hydrogen into carbon monoxide via CO-shift reaction.

The hydrocarbon flow 12 produced in the Fischer-Tropsch synthesis unit 18 is then advantageously introduced in the treatment unit 24 to produce valuable products, as defined above.

The process according to the invention is tailored to the needs of the installation 10, since only the necessary quantity of fuel gas 40 is withdrawn from the Fischer-Tropsch tail gas 38, the remaining part of the Fischer-Tropsch tail gas 38 being recycled into the process.

Nevertheless, the recycling of Fischer-Tropsch tail gas 38 does not disrupt the control of the process, since the carbon dioxide content in the Fischer-Tropsch recycled flow 36 is permanently adjusted in order to obtain a target hydrogen to carbon monoxide ratio at the outlet of the synthesis gas generation unit 16.

The process according to the invention has the advantage of allowing the operation at a reduced consumption of oxidizing flow 30. This reduces the operational costs of the process.

The carbon dioxide concentration in the tail gas recycle flow 36 is used as a control variable to control the hydrogen to carbon monoxide ratio in the synthesis gas 32.

Consequently, the carbon dioxide content in the synthesis gas flow 32 is greatly reduced, for example is reduced to quantities lower than 10%, specifically lower than 6% in volume. The efficiency of the conversion of carbon monoxide in the Fischer-Tropsch unit 18 is hence improved, which consequently reduces the sizes of many of the vessels and interconnecting pipework in the gas loop, for a given production rate. This reduces the capital expenditures.

Overall, the tail gas in excess of the fuel gas demand is collected and recycled to the synthesis gas generation unit 16, even if its carbon dioxide content is not in accordance with the target hydrogen to carbon monoxide ratio in the synthesis gas 32. To obtain such improvement, the process according to the invention adjusts the exact carbon dioxide content in the unused tail gas so that, once recycled to the synthesis gas generation unit, the hydrogen to carbon monoxide ratio in the synthesis gas provided to the Fischer Tropsch unit is maintained, whatever the overall plant operating conditions and/or fuel gas overall consumption and/or feed gas composition are. Overall plant performances are maximized at all time and conditions. This result is obtained without increasing the size of the equipment used for carrying out the process.

The economic benefits of a lower carbon dioxide concentration in the synthesis gas flow 32 are therefore achieved with the process according to the invention. An additional product stream in the form of a plain flow 48 of carbon dioxide can be produced for use for example in enhanced oil recovery, as a beverage preservative, as a feedstock for urea manufacture, for the manufacture of solid carbon dioxide for refrigerant purposes, as a solvent for supercritical extraction or for other applications.

The process according to the invention is particularly adapted to synthesis gas generation units 16 generating a high hydrogen to carbon monoxide ratio, such as units comprising Autothermal Reformer (ATR), catalytic partial oxidation (CPOx) and/or Steam methane reformer (SMR) or a combination as such.

In a variation, shown in dotted lines in FIG. 1, at least a part 52 of flow 50 is introduced into the synthesis gas flow 32, downstream of the synthesis gas generation unit 16.

Figure 2:
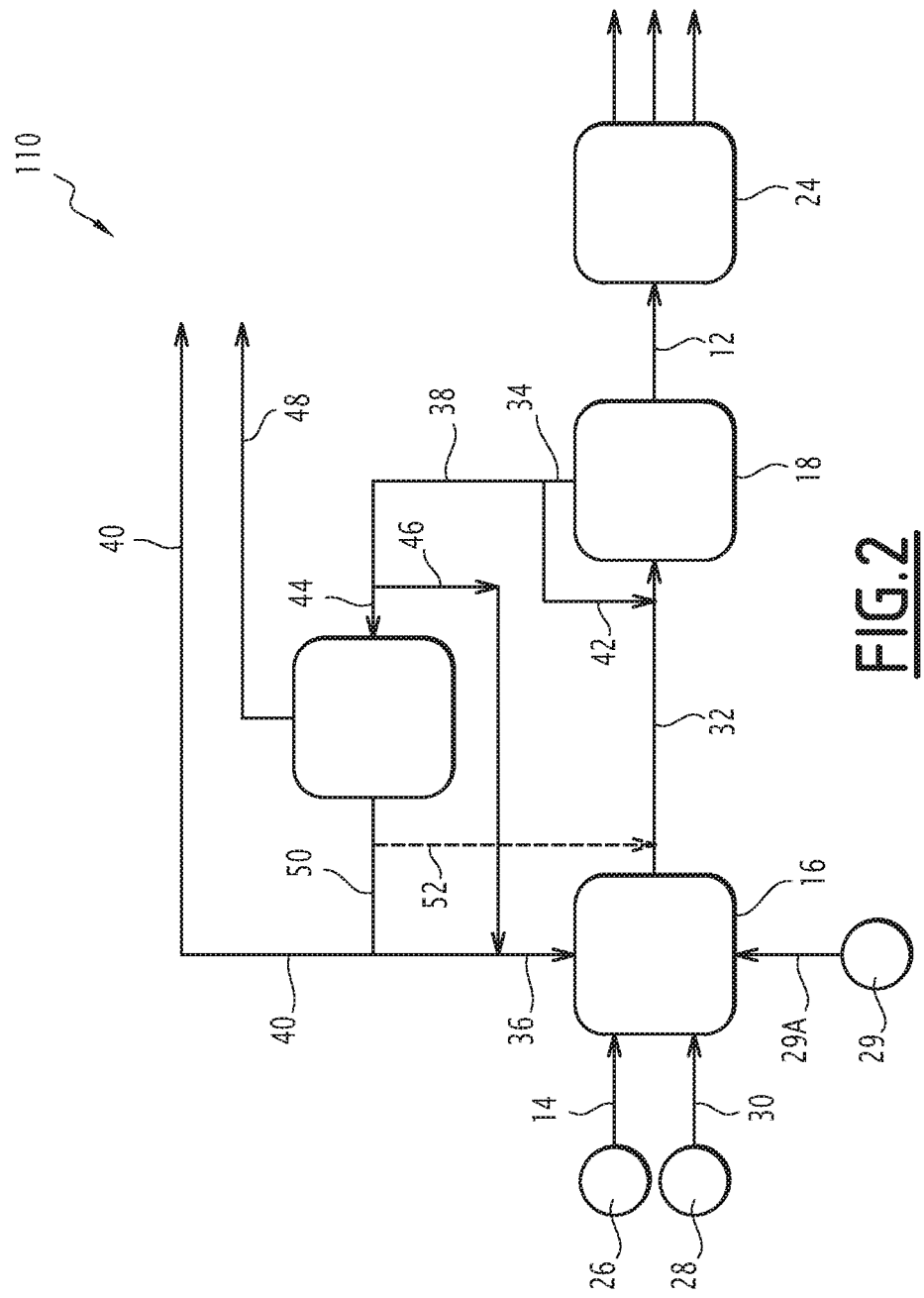
FIG. 2 is a schematic view of a second installation according to the invention.

A second installation 110 according to the invention is illustrated by FIG. 2. The process shown in FIG. 2 differs from the process shown in FIG. 1 by the feature by which the fuel gas flow 40 is withdrawn in the carbon dioxide depleted flow 50.

The advantage of the second installation 110 lies in the fact that a higher proportion of the available carbon dioxide can be captured at a point in the process where the gas pressure is high and the carbon dioxide concentration is favorable.

This is beneficial when the carbon dioxide can be marketed, e.g. through enhanced oil recovery or food and beverage industry, or can be sequestered.

The carbon dioxide content in the fuel gas flow 40 is therefore low, for example lower than 20% molar, more suitably less than 10% molar, more preferably less than 5% molar, and in particular less than 2% molar, which allows a greater heating value of the fuel flow 40.

The operation of the second process according to the invention is similar to that of the first process.

In a variant, the method according to the invention does not comprise a step of forming a bypass flow 46. The adjustment of the carbon dioxide content is carried out directly in the carbon dioxide removal unit 22 by controlling the amount of carbon dioxide removed in the first flow 44.

The invention claimed is:

1. A process for producing a hydrocarbon product flow from a gaseous hydrocarbonaceous feed flow, the process comprising:
   introducing the feed flow in a synthesis gas generation unit to form a synthesis gas flow by reforming and/or partial oxidation of the feed flow;
   introducing the synthesis gas flow in a Fischer-Tropsch synthesis unit, to form the hydrocarbon product flow;
   forming a Fischer Tropsch offgas flow from the Fischer-Tropsch synthesis unit;
   separating the Fischer Tropsch offgas flow into a Fischer Tropsch offgas recycle flow and a Fischer Tropsch tail gas flow;
   recycling the Fischer Tropsch offgas recycle flow in the synthesis gas flow fed to the Fischer Tropsch synthesis unit;
   at least partially removing carbon dioxide from a first flow formed from the Fischer-Tropsch tail gas flow in a carbon dioxide removal unit to form a carbon dioxide depleted flow;
   forming a tail gas recycle flow from the carbon dioxide depleted flow;
   introducing the tail gas recycle flow in the synthesis gas generation unit and/or in the synthesis gas flow;
   adjusting the carbon dioxide content in the tail gas recycle flow to control the hydrogen to carbon monoxide molar ratio in the synthesis gas flow to a target hydrogen to carbon monoxide molar ratio;
   forming a bypass flow from the tail gas flow to bypass the carbon dioxide removal unit; and
   mixing the carbon dioxide depleted flow with the bypass flow to form the tail gas recycle flow;
   wherein the adjusting of the carbon dioxide content further includes controlling the relative flowrates of the bypass flow and of the carbon dioxide depleted flow as a function of the target hydrogen to carbon monoxide ratio in the synthesis gas.

2. The process according to claim 1, wherein the carbon dioxide volume content in the tail gas recycle flow is smaller than 30% molar.

3. The process according to claim 2 wherein said carbon dioxide volume content is smaller than 20% molar.

4. The process according to claim 1, wherein the reforming and/or partial oxidation of the feed flow is carried out by one or a combination of an autothermal reformer, catalytic partial oxidation reformer, non-catalytic partial oxidation reformer, gas heated reformer and steam methane reformer.

5. The process according to claim 1, wherein the hydrogen to carbon monoxide volume ratio in the synthesis gas flow is comprised between 1.7 to 2.2.

6. The process according to claim 5, wherein said hydrogen to carbon monoxide volume ratio is comprised between 1.9 and 2.1.

7. The process according to claim 1, comprising extracting a fuel gas flow from the tail gas flow, upstream of the carbon dioxide removal unit.

8. The process according to claim 1, comprising extracting a fuel gas flow from the carbon dioxide depleted flow.

9. The process according to claim 7, comprising adjusting the flow rate of the fuel gas flow to partially or fully meet the fuel gas demand of the process.

10. The process according to claim 1, comprising providing a vapor and/or liquid water flow to the synthesis gas generation unit and maintaining the molar ratio of water to carbon in the feed flow and tail gas recycle flow fed to the synthesis gas generator unit constant.

11. The process according to claim 10, wherein said constant molar ratio is comprised between 0 and 3.

12. The process according to claim 11, wherein said constant molar ratio is comprised between 0.3 and 0.9 when the reforming and/or partial oxidation of the feed flow is carried out in an autothermal reformer, a catalytic partial oxidation reformer and/or a non-catalytic reformer.

13. The process according to claim 11, wherein said constant molar ratio is comprised between 1.4 and 2.5 when the reforming and/or partial oxidation of the feed flow is carried out in steam methane reformer.

14. The process according to claim 1, comprising treating the liquid hydrocarbon product flow to form diesel and/or kerosene and/or naphtha.

15. The process according to claim 1, wherein the synthesis gas flow contains less than 10% by volume of carbon dioxide.

* * * * *